United States Patent
Harsha et al.

(10) Patent No.: US 10,034,121 B2
(45) Date of Patent: Jul. 24, 2018

(54) RAN OVERLOAD CONTROL FOR M2M COMMUNICATIONS IN LTE NETWORKS

(71) Applicant: KABUSHIKI KAISHA TOSHIBA, Tokyo (JP)

(72) Inventors: Chetan Harsha, Bristol (GB); Zhong Fan, Bristol (GB); Fengming Cao, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/908,775

(22) PCT Filed: Aug. 1, 2013

(86) PCT No.: PCT/GB2013/052067
§ 371 (c)(1),
(2) Date: Jan. 29, 2016

(87) PCT Pub. No.: WO2015/015136
PCT Pub. Date: Feb. 5, 2015

(65) Prior Publication Data
US 2016/0165378 A1    Jun. 9, 2016

(51) Int. Cl.
*H04W 4/00* (2018.01)
*H04W 74/08* (2009.01)
(Continued)

(52) U.S. Cl.
CPC ............ *H04W 4/005* (2013.01); *H04L 5/006* (2013.01); *H04W 4/70* (2018.02); *H04W 74/008* (2013.01); *H04W 74/0833* (2013.01)

(58) Field of Classification Search
CPC ............... H04W 4/005; H04W 74/008; H04W 74/0833; H04W 48/08; H04W 48/16; H04W 28/0215; H04W 4/70
See application file for complete search history.

(56) References Cited

U.S. PATENT DOCUMENTS

| 8,938,233 B2 * | 1/2015 | Hsu | H04W 4/70 455/432.1 |
| 9,036,576 B2 * | 5/2015 | Lee | H04L 1/1877 370/329 |

(Continued)

FOREIGN PATENT DOCUMENTS

| EP | 2 120 371 | 11/2009 |
| GB | 2488512 A1 | 9/2012 |

(Continued)

OTHER PUBLICATIONS

International Search Report and Written Opinion dated Jun. 24, 2014, directed to International Application No. PCT/GB2012/052067 issued by the European Patent Office; 16 pages.

(Continued)

*Primary Examiner* — Ahmed Elallam
(74) *Attorney, Agent, or Firm* — Finnegan, Henderson, Farabow, Garrett & Dunner, L.L.P.

(57) ABSTRACT

In a 3GPP LTE-A support for Mobile Type Communications, that is, M2M communications scheme, improvements of the random access are necessary to prevent random channel overload. Enhanced back¬off in the presence of overload is such a mechanism, Counting the number of devices seeking RACH based on the number of received random access requests or else responses, and allocating Random Access resources on the basis of the number of requests, is another. Further, a channel aware resource allocation approach provides a way of determining, from the received requests, delay-tolerance of the M2M devices, based on which they are prioritized in accessing the random channel. Even within the prioritized devices, a smaller subset thereof may be prioritized further, according to radio conditions, to provide better access to those with higher SNR RBs.

5 Claims, 15 Drawing Sheets

(51) Int. Cl.
*H04W 74/00* (2009.01)
*H04L 5/00* (2006.01)
*H04W 4/70* (2018.01)

(56) References Cited

U.S. PATENT DOCUMENTS

| | | | |
|---|---|---|---|
| 9,456,459 B2* | 9/2016 | Rost | H04W 74/0833 |
| 9,854,564 B2* | 12/2017 | Chun | H04W 72/04 |
| 2011/0199905 A1* | 8/2011 | Pinheiro | H04W 4/005 |
| | | | 370/235 |
| 2012/0033613 A1 | 2/2012 | Lin et al. | |
| 2012/0063305 A1 | 3/2012 | Chiu et al. | |
| 2012/0220325 A1 | 8/2012 | Zhou et al. | |
| 2012/0263039 A1* | 10/2012 | Ou | H04W 28/0205 |
| | | | 370/235 |
| 2012/0281530 A1* | 11/2012 | Sambhwani | H04W 28/0284 |
| | | | 370/230 |
| 2012/0307774 A1* | 12/2012 | Zhao | H04W 74/08 |
| | | | 370/329 |
| 2013/0021997 A1* | 1/2013 | Lee | H04W 74/0841 |
| | | | 370/329 |
| 2013/0128733 A1* | 5/2013 | Lee | H04W 74/02 |
| | | | 370/230 |
| 2014/0169283 A1* | 6/2014 | Viorel | H04W 74/085 |
| | | | 370/329 |
| 2014/0328258 A1* | 11/2014 | Cheng | H04W 4/005 |
| | | | 370/329 |
| 2016/0150573 A1* | 5/2016 | Pani | H04W 4/005 |
| | | | 370/329 |
| 2016/0249384 A1* | 8/2016 | Di Girolamo | H04W 74/0808 |
| 2017/0019938 A1* | 1/2017 | Salkintzis | H04W 76/022 |

FOREIGN PATENT DOCUMENTS

| | | |
|---|---|---|
| WO | WO 2011/098992 A1 | 8/2011 |
| WO | WO 2012/121566 A2 | 9/2012 |
| WO | WO-2012/135996 | 10/2012 |

OTHER PUBLICATIONS

Cheng et al., "Prioritized Random Access with Dynamic Access Barring from RAN Overload in 3GPP LTE-A Networks," International Workshop on Machine-to-Machine Communications (2011), pp. 368-372.

Lioumpas et al., "Uplink Scheduling for Machine-to-Machine Communications in LTE-based Cellular Systems," International Workshop on Machine-to-Machine Communications (2011), pp. 353-357.

Cheng et al., "RACH Collision Probability for Machine-Type Communications," IEEE VTC-Spring (May 2012), pp. 1-5.

$3^{rd}$ Generation Partnership Project; Technical Specification Group Radio Access Network; Evolved Universal Terrestrial Radio Access (E-UTRA); Physical Channels and Modulation (Release 10), 3GPP TS 36.211 V10.5.0 (Jun. 2012), pp. 1-101.

LTE; Evolved Universal Terrestrial Radio Access (E-UTRA); Medium Access Control (MAC) protocol specification (3GPP TS 36.321 Version 8.4.0 Release 8), ETSI TS 136 321 V8.4.0 (Jan. 2009), pp. 1-44.

$3^{rd}$ Generation Partnership Project; Technical Specification Group Radio Access Network; Study on RAN Improvements for Machine-type Communications; (Release 11), 3GPP TR 37.868 V11.0.0 (Sep. 2009), pp. 1-28.

Baddour et al., "Autoregressive Modeling for Fading Channel Simulation," IEEE Transactions on Wireless Communications (Jul. 2005), 4:1650-62.

* cited by examiner

RAN OVERLOAD CONTROL FOR M2M COMMUNICATIONS IN LTE NETWORKS

CROSS REFERENCE TO RELATED APPLICATION

This application is a national phase application based on PCT/GB2013/052067, filed Aug. 1, 2013, the content of which is incorporated herein by reference.

FIELD

Embodiments described herein relate to the handling of demand for radio access in M2M communications.

BACKGROUND

Machine-to-machine (M2M) communication, also called Machine Type Communication (MTC), is the automatic exchange of information between end devices such as machines, vehicles or a control centre. Such communication does not necessarily need human intervention, and may not be resultant from initiation by a human user.

LTE (a standard technology developed by the 3rd Generation Partnership Project, 3GPP) cellular networks have been selected to support MTC applications since they offer a large coverage and they are all-IP networks. The benefits of such a deployment are complementary. For MTC applications, LTE offers good communications opportunities. For the providers of LTE networks, increased use of such networks enhances revenue. However, the deployment of MTC applications over LTE networks can imposes certain technical requirements.

It is envisaged that any deployment of MTC devices should expect a large number of such devices to be deployed in a specific area. In such a circumstance, the supporting communications network will experience increased average load, but may also encounter possible surges of MTC traffic.

As a result, network congestion may arise, such as in the form of Radio Network Congestion and/or Signalling Network Congestion. This could be the result of mass concurrent data and signalling transmission. This congestion may cause intolerable delays, packet loss or even service unavailability.

When the number of user equipment (UE) units deployed in a particular locality is within an acceptable range, it has been found that random access can provide efficient request delivery. However, the number of MTC devices could be far larger than the expected number of UE units. Investigations indicate that both MTC devices and UE may suffer continuous collisions at the random access channel (RACH) when a large number of MTC devices are involved.

DESCRIPTION OF SPECIFIC EMBODIMENTS

Figure 1:
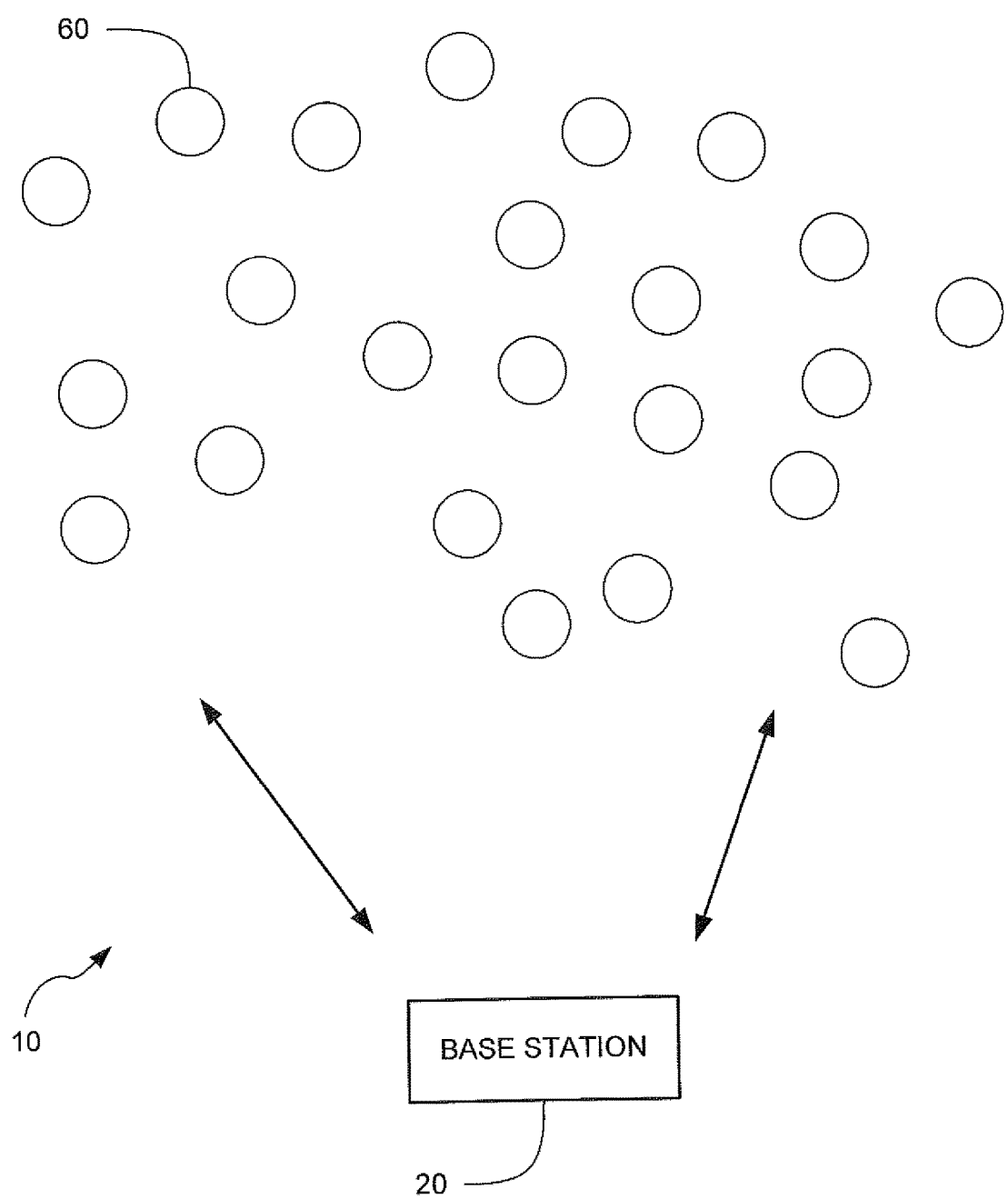
FIG. 1 is a schematic illustration of a network implementing one or more of the embodiments described herein.

A first embodiment described herein provides a method of performing radio access network (RAN) level access barring for a machine-to-machine (M2M) device in a wireless communications network, comprising maintaining a count of contention based random access channel (RACH) requests to the M2M device from other M2M devices in the network, and allocating channel resource blocks to requesting M2M devices in accordance with the count.

The maintaining of a count may comprise counting RACH requests received by the M2M device.

The maintaining of a count may comprise counting random access responses (RAR) sent by the M2M device in response to RACH requests.

A second embodiment provides a method of performing radio access network (RAN) level access barring for a machine-to-machine (M2M) device in a wireless communications network, comprising, for a random access channel (RACH) opportunity comprising a plurality of random access opportunities (RAO), determining from received RACH requests, a number of least delay tolerant requesting M2M devices, the number being no more than the number of available RAOs, allocating those determined least delay tolerant requesting M2M devices to RAOs, and barring any remaining requesting M2M devices in respect of that RACH opportunity.

The second embodiment may determine the number of available RAOs from the number of RAOs not allocated to other communications.

The allocating of the second embodiment may comprise constructing a channel state information matrix with respect to signal to noise ratio (SNR) measurements gathered at the M2M device, and allocating the determined requesting M2M devices to available RBs by reference to SNR.

The least delay tolerant determined requesting M2M device may be allocated to the RB with highest SNR.

The determined requesting M2M devices may be ordered by delay tolerance, and may be allocated to the RBs in order of SNR.

A third embodiment described herein comprises a method of performing radio access network (RAN) level access barring for a machine-to-machine device in a wireless communication network, comprising determining from received RACH requests, a number of least delay tolerant requesting M2M devices, the number being no more than the number of available RAOs, determining a density of M2M devices accessible to the M2M device and, if the density is in excess of a threshold, firstly allocating firstly a first subset of the number of least delay tolerant requesting M2M devices to RAOs, and secondly allocating the others in the number of least delay tolerant requesting M2M devices, and barring any remaining requesting M2M devices in respect of that RACH opportunity, otherwise allocating the determined number of least delay tolerant requesting M2M devices to RAOs, and barring any remaining requesting M2M devices in respect of that RACH opportunity.

In the third embodiment, the number of least delay tolerant requesting M2M devices may be determine by sorting a list of requesting M2M devices by reference to delay tolerance, and selecting a number of the sorted list.

The number of devices determined as said number of least delay tolerant devices may be 200.

A fourth embodiment described herein comprises a machine-to-machine (M2M) communications device for use in a communications network, configured to perform a method in accordance with any one of the preceding embodiments.

A fifth embodiment described herein comprise a non-transient computer program product, comprising computer executable instructions which, when loaded into a suitable machine-to-machine communications device, cause that device to perform a method in accordance with any one of the first, second or third embodiments.

The RACH procedure considered here is the random access procedure in LTE as it has been specified by 3GPP. More information and details on the random access procedure can be found in the following specifications, which are herein incorporated by reference:

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.5.0 June 2012.

"LTE; Evolved Universal Terrestrial Radio Access (E-UTRA); Medium Access Control (MAC) protocol specification (3GPP TS 36.321 version 8.4.0 Release 8)", ETSI TS 136 321 V8.4.0, January 2009.

As will be ascertained from those specifications, there are two forms of the RACH procedure, namely contention-based and non-contention-based. The difference between these two procedures concerns whether or not there is a possibility for failure using an overlapping RACH preamble or Random access opportunity. In this disclosure, only Contention Based RA is considered.

Contention Based Random Access

Figure 8:
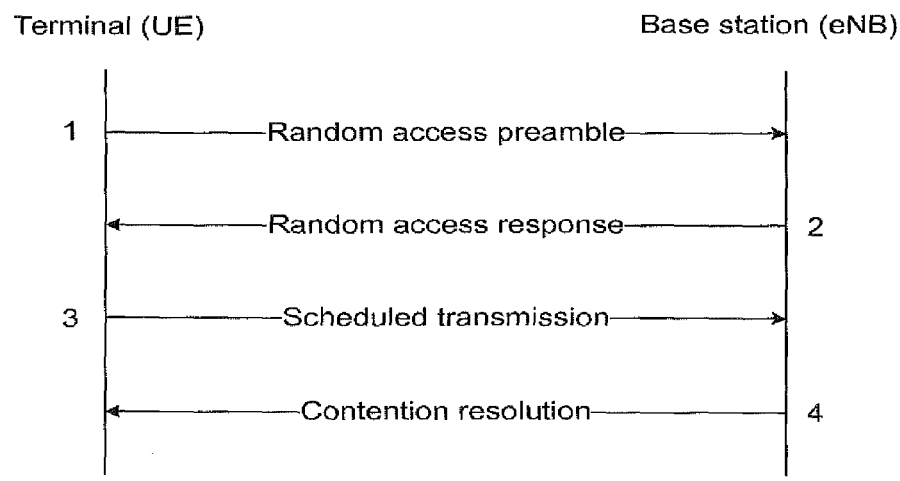
FIG. 8 is a process diagram illustrating a channel access procedure implemented in a described embodiment.

FIG. 8 illustrates a contention based random access procedure. The procedure is performed between a base station (eNB, in LTE terminology) and a user equipment node (UE). Each step of the procedure is as explained below.

1. Random Access Preamble:

The UE transmits a random access preamble via PRACH (Physical Random Access Channel), which is a simple ID, to the base station (eNB) at a random access opportunity. The preamble is randomly selected from 64 (6 bits random id) available values.

This step is illustrated with regard to a single UE, but it will be appreciated by the reader that several UEs could send preambles to the eNB at roughly the same time.

2. Random Access Response (RAR):

This step contemplates the scenario whereby the eNB receives a preamble from a plurality of UEs in step 1. In step 2, the eNB responds using PDCCH, to each UE whose preamble was detected in step 1. The response contains, among other things, the same preamble that the detected UE sent. This identifies the response message to the corresponding UE. If no Random Access Response (RAR) is received within a TTI window, random access is considered to be unsuccessful. Likewise, if all of the received RARs contain Random Access Preamble identifiers that do not match transmitted Random Access Preambles, the Random Access Response reception is considered unsuccessful.

3. Scheduled Transmission:

If a UE receives a RA response in step 2 containing a preamble that matches its own preamble sent in step 1, that UE transmits its unique identity to the eNB. This unique identity makes it possible for the eNB to separate two or more UEs that have sent the same preamble. If a UE does not receive its own preamble in this step it will determine that this random access attempt has been unsuccessful—to gain access to the channel, it will need to re-commence the process from step 1.

4. Contention Resolution:

This step is optional. The eNB uses this step to end the RACH procedure. In this step, the eNB responds to those messages received in step 3 containing unique identifiers of UEs. The response message, in this step, contains a unique identity of a UE, extracted from one of the messages received in step 3. Of course, if only one message was received at the eNB in step 3, there is only one unique identity to respond with. If more than one message was received in step 3, there will need to be a selection of one of these messages, so that only one unique identity is sent out in step 4.

Thus, in this step, UEs that have chosen the same preamble may all have sent their unique identities in step 3, but only one of them will receive its own unique identity in the contention resolution response. The other UEs will not receive their corresponding unique identity, and will in response declare this random access attempt unsuccessful. Any further requirement for channel access by such a UE will necessitate commencing the procedure again, from step 1.

If a UE exceeds the maximum number of allowed RA attempts, the whole random access procedure is declared as failed. It would then need to be restarted in respect of the next random access opportunity.

Random Access Opportunity

Slotted ALOHA is a random channel access protocol which has been widely adopted in a range of different communications implementations. In Slotted ALOHA, access attempts are restricted to slots defined in time, to avoid partial overlap between users.

Figure 9:
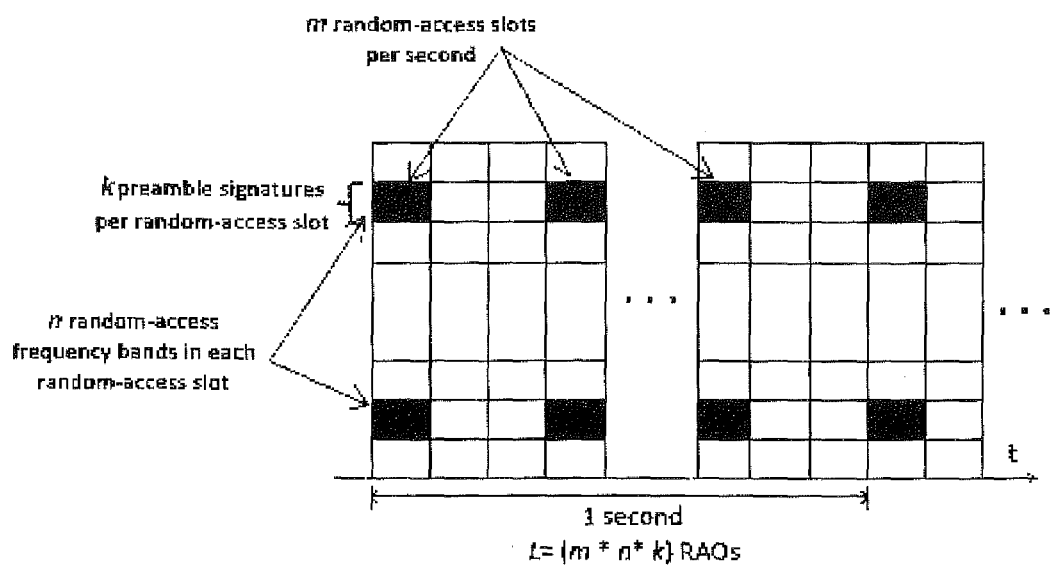
FIG. 9 is a graph illustrating channel access opportunities in a time slot of a channel as established in a described embodiment.

Similarly, in LTE, the reserved time-frequency resources for random access—the random access opportunities (RAO)—are slotted with respect to time, and the UE selects an opportunity at random among the available opportunities. Thus RAO's are the combination of Slot, Subcarrier and Preamble Signature. A RACH opportunity is defined as a three dimensional radio resource block on a time-frequency domain with a fixed number of preambles. This forms the resource of interest in this disclosure. FIG. 9 shows the model of RAO for LTE. This is as employed in "RACH Collision Probability for Machine-type Communications" (Cheng, Wei, Tsao, Ren; IEEE 75th Vehicular Technology Conference, May 2012) and FIG. 9 is based thereon.

In FIG. 9, a graph is illustrated of a channel expressed by frequency over time. As shown, there are n random access frequency bands in each random access slot, and in random access slots per second. The protocol provides k distinct preamble signatures, which can be used per random access slot, per frequency band. Thus, there are $L=m*n*k$ random access opportunities in the LTE channel, per second.

A number of RAN level contention resolution mechanisms are proposed by 3GPP such as:

Access Class barring schemes—separate Access Class(es) are introduced for MTC devices to allow the network to separately control the access from these MTC devices, in addition to access control for other devices;

Separate RACH resources for MTC devices, so that MTC and H2H devices share the RACH resource and experience the same access collision probability etc.

Though various RAN level contention resolution mechanisms have been proposed, none of them are widely acknowledged as an appropriate solution. All the proposed methods in 3GPP are designed with certain assumptions as to the number of devices employed. In particular, it is expected that the number of devices will be relatively small, for instance tens or hundreds of devices. In such conditions, the probability of collision will be markedly lower than in the situation, which may be encountered in an M2M implementation, when tens of thousands of devices may be deployed. Further, the approaches taken in 3GPP take no account of channel quality.

In general terms, embodiments described herein extend the backoff scheme provided in the existing LTE approach to accommodate a large number of devices.

Further embodiments provide a facility for evaluating the exact number of devices contending for access at a given instance of time.

Further embodiments described below provide channel aware resource allocation in non-correlated and correlated environments, taking account of channel conditions and permissible delay of each device. In certain implementations, this may enable a more realistic approach to fulfilling the requirements of M2M communication.

FIG. 1 illustrates a network 10 implementing an embodiment to be described herein.

As shown in FIG. 1, the network 10 comprises a base station 20, wirelessly accessible by a plurality of machines 60. The term "machine" here is used to signify that the units in question may well be task specific devices, rather than general purpose communications devices (tablets, smartphones, laptops etc.). Typical examples of machines, for M2M communication, include meters, monitors, sensors and the like. Certain devices, hitherto not provided with significant communications or computing capability, may now be offered as such. So, for example, domestic appliances may usefully be connectable to a base station by wireless communication, to report faults, to indicate that a consumable needs to be replenished or, merely that a functional cycle has been completed successfully.

The present disclosure is not limited to such devices and the reader will appreciate that other devices could also be represented by the machines 60 in FIG. 1. The reader will, for instance, be directed to the potential use of the present disclosure in connecting medical or industrial equipment, to allow communication of data as required.

Figure 2:
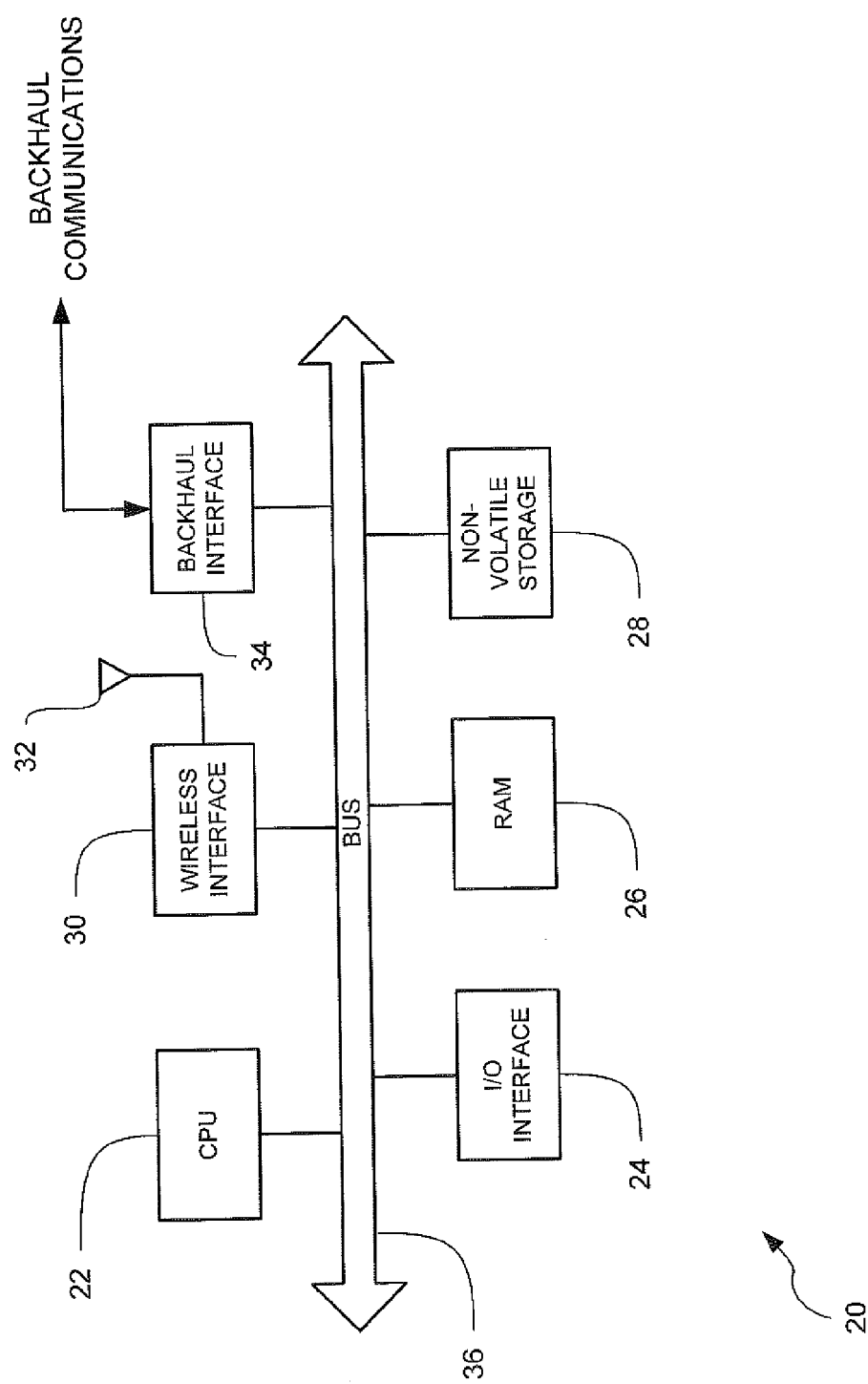
FIG. 2 is a schematic illustration of a base station of the network illustrated in FIG. 1.

As shown in FIG. 2, the base station 20 comprises a computer of typical structure, in that it comprises a central processing unit (CPU) 22 operable to execute program instructions presented thereto. The operation of the base station 20 can be accessed by way of an input/output interface 24, which, in this example, provides connection capabilities for a display, user interface equipment such as a keyboard and a mouse, and so on. The I/O interface 24 may, in other embodiments, provide interface to other equipment, such as data recorders, recorded media readers, sound generation equipment (to provide warning sounds in the event that an alert is required) and so on. The reader will appreciate that this is not relevant to the present disclosure.

A random access memory (RAM) 26 provides a data storage facility to enable the CPU 22 to store and read back data used in the operation of the base station 20. A non-volatile storage 28 provides a facility for the permanent storage of program instructions and, optionally, data, to establish an initial configuration of program instructions to be executed by the CPU 22. The program instructions stored in the non-volatile storage 28 may be permanent (i.e. read-only) or may be re-writeable in the event that a program upgrade facility is to be provided. In one example, some of the program storage is permanent and non-rewriteable and other parts of the program storage is modifiable.

A wireless interface 30 provides hardware facilities for the interaction between radio signals detected and emitted at an antenna 32 and the rest of the base station 20. The wireless interface 30 comprises encoder and decoder facilities, and modulation and demodulation facilities, in a conventional manner. The wireless interface 30 also establishes a channel access process, which will be described in due course, to enable management of a large plurality of machines 60 seeking access to wireless communication opportunities with the base station 20.

A backhaul interface 34 provides hardware facilities for the interaction of the base station 20 with other equipment, not illustrated in FIG. 1. For instance, it may be convenient to connect base stations 20 in a network, such as is the case with mobile telephony networks (cellular telephony). The connections between base stations 20 may be by wired connection, or by high bandwidth wireless communications means, such as line-of-sight optical communication or microwave, or by fibre optical communication. These are merely examples and are not intended to indicate an exhaustive list.

To provide communications between the above mentioned elements, a bus 36 is illustrated.

The operation of the hardware of the base station 20 is carried on by the execution of computer executable instructions, which can be stored in the non-volatile storage 28 and, as convenient, the RAM 26. Use of the RAM 26 may be appropriate if the speed of retrieval, and therefore execution, of program instructions, is thereby improved. Further, the RAM 26 could be used to stored frequently used instructions, such as looping instructions, if the need arises. Further, the CPU 22 may have an integrated instruction buffer for such purposes. As with many examples of CPUs, the present embodiment contemplates provision and use of registers and other data storage means to allow for implementation of mathematical operations at speed.

Figure 3:
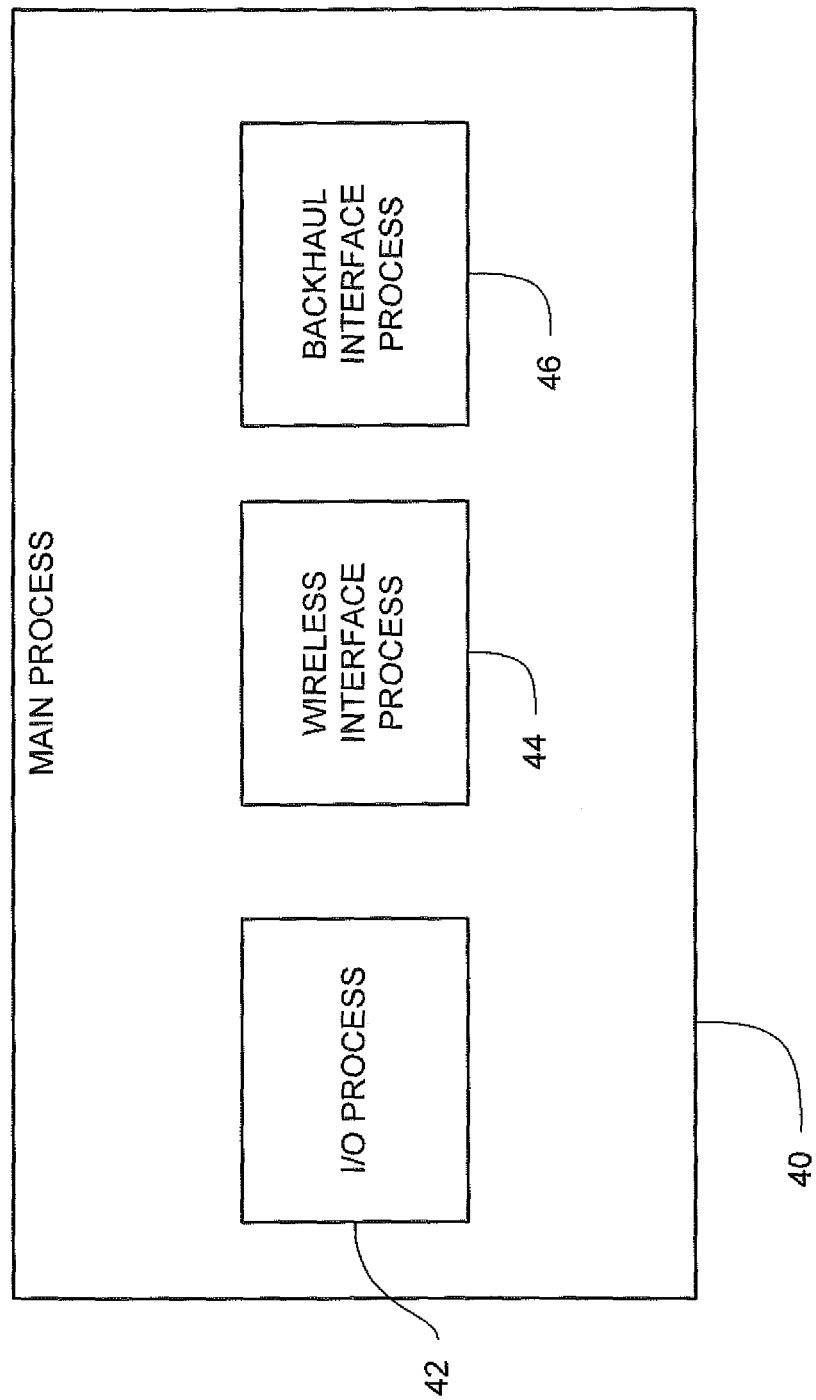
FIG. 3 is a schematic illustration of the functional implementation of a main process of the base station of FIG. 2.

The processes implemented on the base station 20 in accordance with this embodiment are schematically illustrated in FIG. 3. FIG. 3 illustrates a main process 40, which represents the overarching control routine enabling the continuation of operation of the base station over time.

During execution of the main process 40, calls are made to an I/O process 42, implementing operation of the I/O interface 24, reading inputs scanned at the I/O interface and sending data thereto, for instance for display.

Further, a wireless interface process 44 operates to manage the hardware provided in the wireless interface 30. The wireless interface process 44 governs all aspects of wireless communication, including encoding and decoding protocols, channel access protocols, and the handling of data transferred over a wireless communications channel established thereby.

Similarly, a backhaul interface process 46 provides communications facilities over the physical channel established by way of the backhaul interface 34.

The reader will appreciate that aspects of the processes 42, 44, 46 may be distributed between execution by the CPU and execution by the respective hardware components 24, 30, 34. The distribution of execution will be dependent on the relative levels of processing capabilities of the various hardware components.

Figure 4:
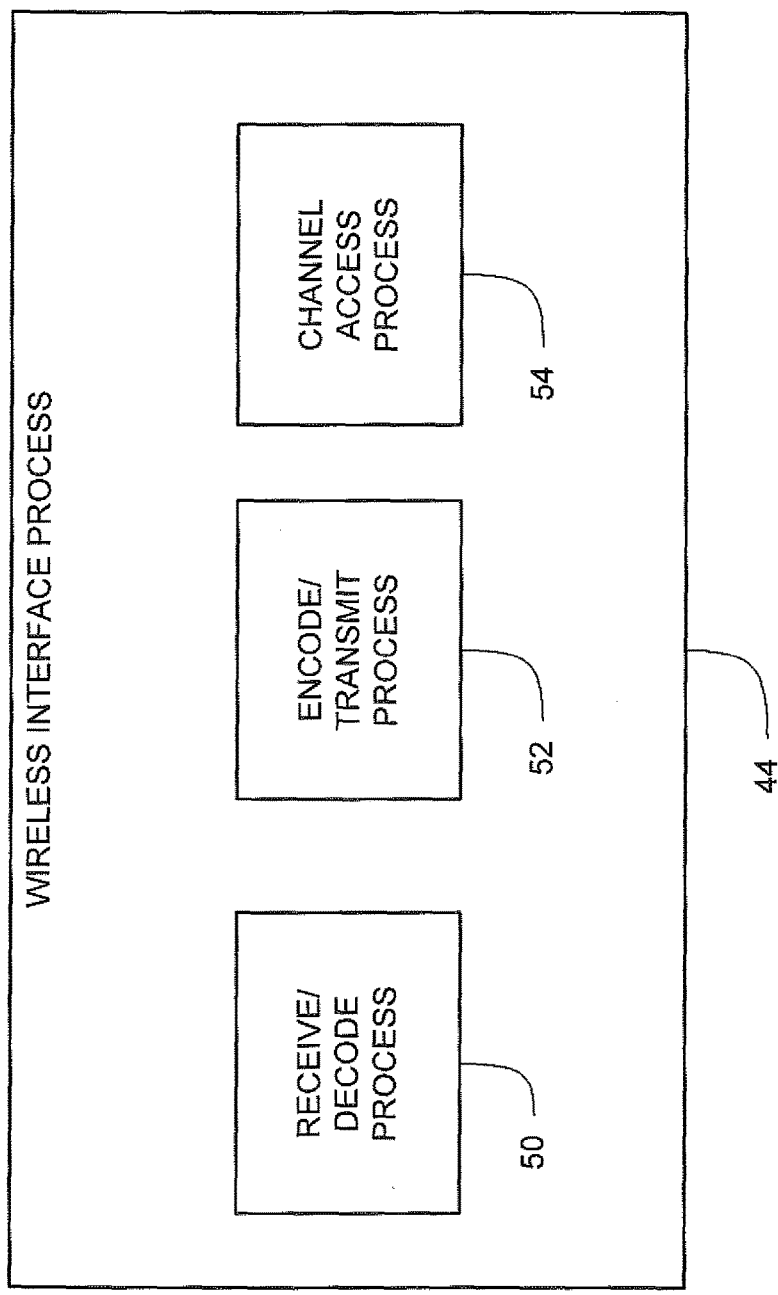
FIG. 4 is a schematic illustration of a wireless interface process of the main process illustrated in FIG. 3.

Within the wireless interface process 44, specific processes are established for the management of a wireless communications channel with respect to the machines 60. As shown in FIG. 4, a Receive/Decode process 50 provides a facility for receiving data borne on a radio signal and detected at the antenna 32, and reverting this to a stream of data acceptable to the other processing components of the CPU. An encode/transmit process 52 offers facilities for processing of data into a form suitable for carriage on a radio emission at the antenna 32. A channel access process 54 provides management of channel access requests received from machines 60, and provision of channel access management commands to such machines 60, for orderly management of the wireless communications channel established by the base station 20.

Figure 5:
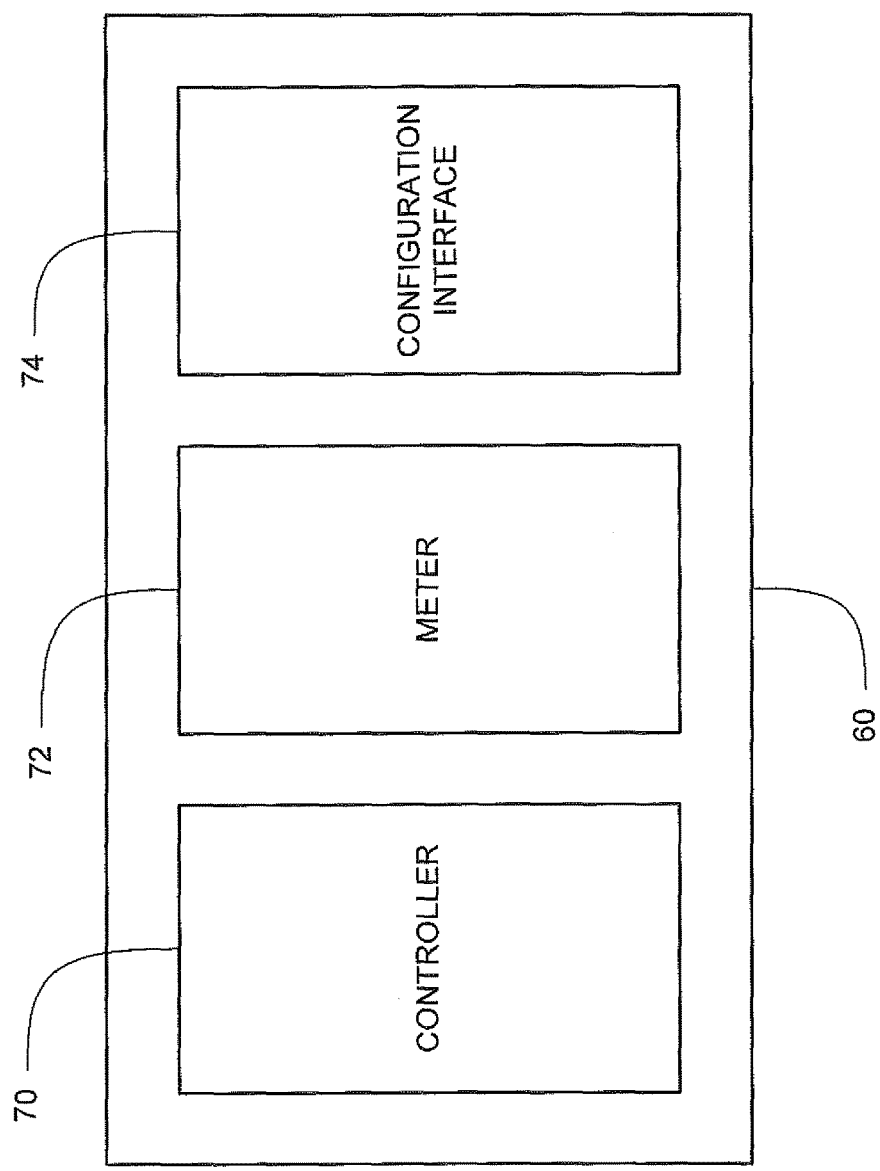
FIG. 5 is a schematic illustration of a machine of the network illustrated in FIG. 1.

A typical machine 60 is illustrated in FIG. 5. The example given is of a metering device, provided with capabilities to monitor a measurable quantity. Such devices might be employed, for example, for environmental monitoring, traffic management, control of industrial processes, or security alarms. Such a machine 60 comprises a controller 70 for overall control of the machine 60, a meter 72 which implements the metering operation, and a configuration interface 74 which provides communications capabilities (such as a USB connection to enable connection of a suitably configured computing device) for configuration purposes. For instance, the configuration interface 74 may be capable of outputting an html webpage, with user selectable configuration links or other embedded input means, to allow a user to configure the operation of the machine 60.

Figure 6:
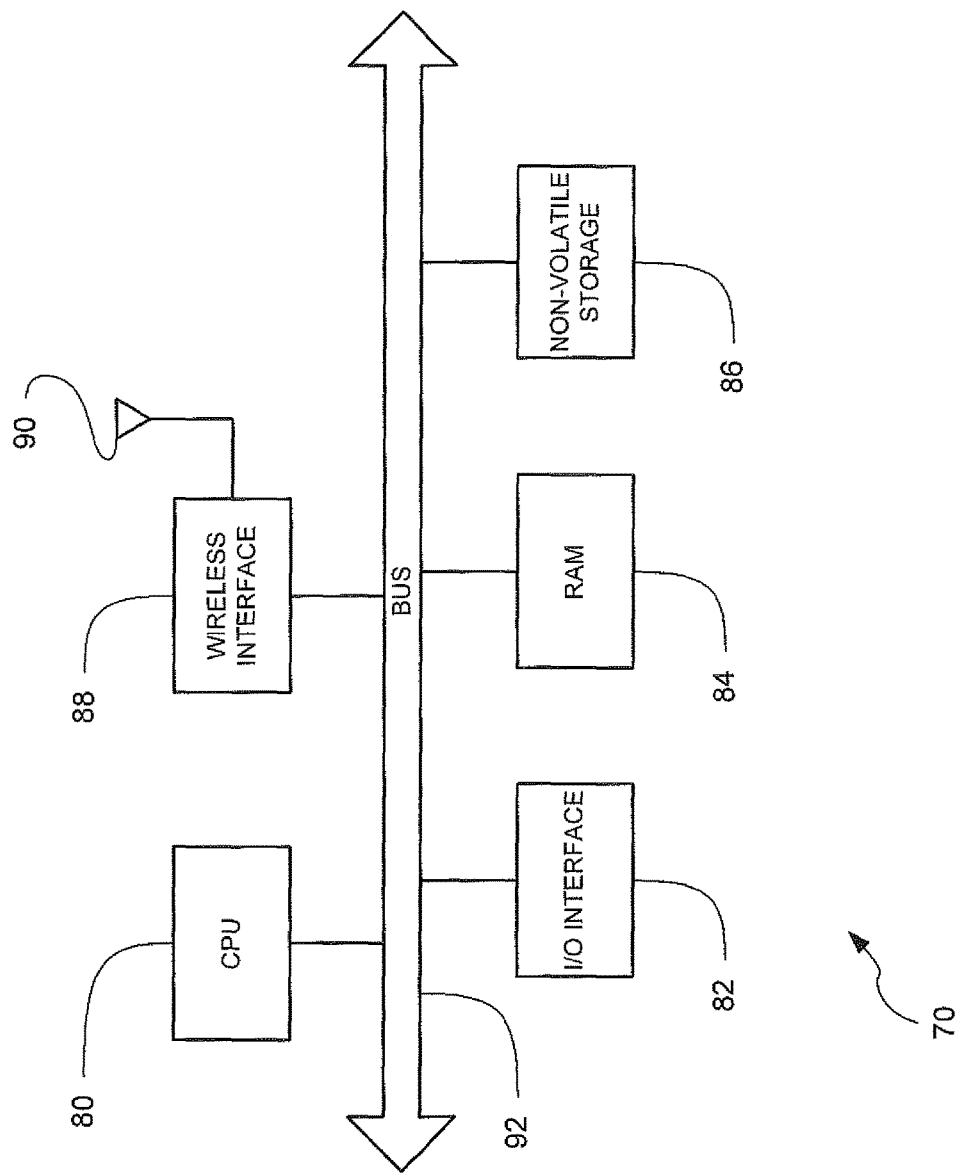
FIG. 6 is a schematic illustration of a controller of the machine illustrated in FIG. 5.

The controller 70 is illustrated in further detail in FIG. 6. As shown in FIG. 6, there are substantial similarities to the arrangement of the base station 20 shown in FIG. 2.

As shown in FIG. 6, the controller 70 comprises a computer of typical structure, in that it comprises a central processing unit (CPU) 80 operable to execute program instructions presented thereto. The operation of the controller 80 can be accessed by way of an input/output interface 82. The input/output interface 82 can be configured to interact with the configuration interface 74, but may also offer other I/O facilities such as connection for a keyboard or mouse, or to a display, depending on the implementation.

A random access memory (RAM) 84 provides a data storage facility to enable the CPU 80 to store and read back data used in the operation of the machine 60. A non-volatile storage 82 provides a facility for the permanent storage of program instructions and, optionally, data, to establish an initial configuration of program instructions to be executed by the CPU 80. The program instructions stored in the non-volatile storage 84 may be permanent (i.e. read-only) or may be re-writeable in the event that a program upgrade facility is to be provided. In one example, some of the program storage is permanent and non-rewriteable and other parts of the program storage is modifiable.

A wireless interface 88 provides hardware facilities for the interaction between radio signals detected and emitted at an antenna 90 and the rest of the controller 70. The wireless interface 88 comprises encoder and decoder facilities, and modulation and demodulation facilities, in a conventional manner. The wireless interface 88 also comprises facilities to enable the controller 70 to gain access to a wireless communications channel established by the base station 20, in a manner which will be described in due course.

To provide communications between the above mentioned elements, a bus 92 is illustrated.

The reader will appreciate that all of the above, and the hardware architecture shown in FIGS. 2 and 6, are likely to be schematic, and that application specific hardware components may be more, or less complex as the need arises. The present description also does not discount the possibility of future development of communications equipment, and appropriate modifications to the presently described embodiments could then be made to take account of that.

The operation of the hardware of the controller 70 is carried on by the execution of computer executable instructions, which can be stored in the non-volatile storage 86 and, as convenient, the RAM 84. As described above, use of the RAM 84 may be appropriate if the speed of retrieval, and therefore execution, of program instructions, is thereby improved. Further, as above, the RAM 84 could be used to stored frequently used instructions, such as looping instructions, if the need arises. Further, as above, the CPU 80 may have an integrated instruction buffer for such purposes. As for the CPU of the base station 20, the present embodiment contemplates provision and use of registers and other data storage means in the CPU 80 to allow for implementation of mathematical operations at speed.

Figure 7:
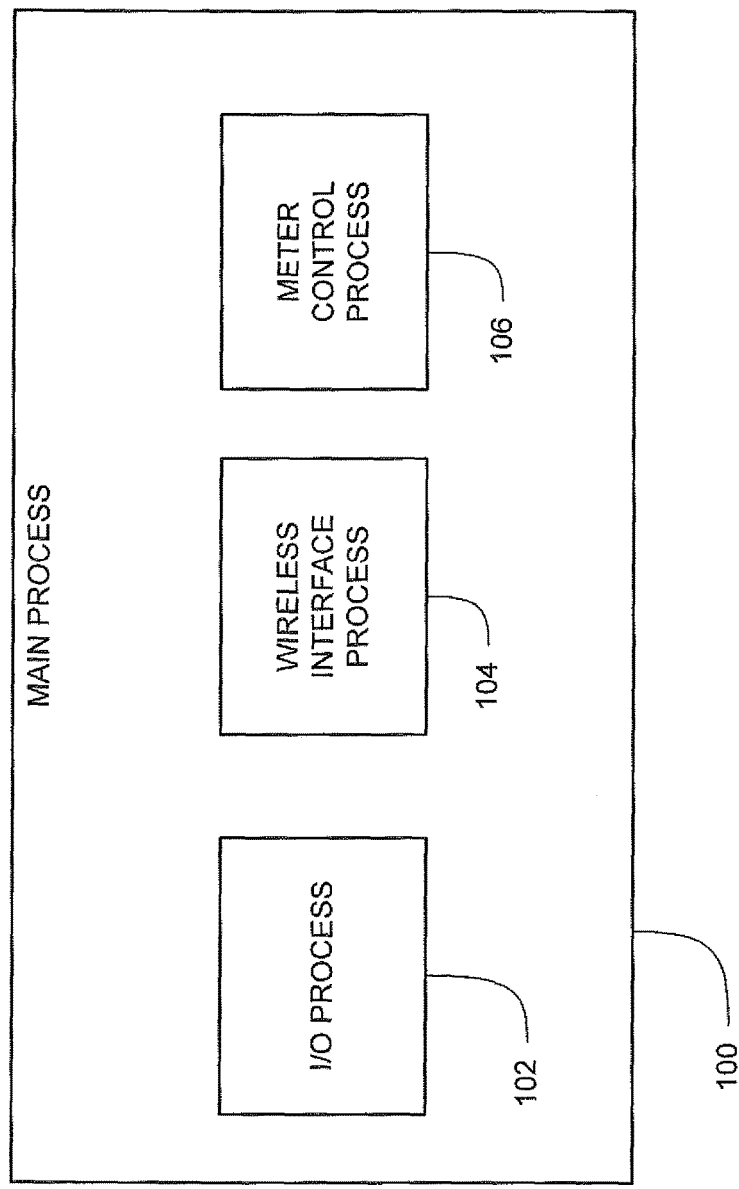
FIG. 7 is a schematic illustration of the functional implementation of a main process of the controller of FIG. 5.

The processes implemented on the base station 70 in accordance with this embodiment are schematically illustrated in FIG. 7. FIG. 7 illustrates a main process 100, which represents the overarching control routine enabling the continuation of operation of the controller 70 over time.

During execution of the main process 70, calls are made to an I/O process 102, implementing operation of the I/O interface 82, reading inputs scanned at the I/O interface and sending data thereto, for instance for establishment of a communications and configuration webpage at a connected computer.

A wireless interface process 104 operates in conjunction with the wireless interface 88, to provide wireless communications facilities to the controller 70.

Further, a meter control process 106 provides facilities for control of the meter 72, as the implementation requires.

Of central interest to the present disclosure is the operation of wireless communications facilities at the base station 20 and at the controller 70. The reader will appreciate that the following disclosure provides an illustrative example from which suitable sets of program instructions can be constructed, for respective execution at each relevant device, for the implementation of the described communications processes.

In particular, the present disclosure is predicated on the implementation of the technologies identified and described in the 3GPP standard specifications referenced above. The following disclosure is of an extension to that existing technology. Working on the basis that the reader will be familiar with the content of the 3GPP specifications, the following description shows how those specifications can be extended and modified to implement the presently described embodiment.

Extended Backoff

A method named 'Extended Backoff' herein will be described, as a background example. The existing 3GPP standards implement a Backoff Indicator, which is a structure in communicated data to allow signalling, from a base station to user equipment, that that user equipment should "back off" (i.e. suspend) access to the channel for an indicated backoff period.

As indicated in the 3GPP specifications, Backoff Indicator is specified as being defined by 4 bits of data. As will be understood, these 4 bits of data express a number with value between 0 and 15. Table 1 indicates the existing allocation of these values of Backoff Indicator to particular Backoff periods. This is quoted from 3GPP TS 36.321 version 8.4.0 Release 8, table 7.2-1.

TABLE 1

LTE Backoff indices and parameters

| Indicator/Index | Backoff Parameter (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

As can be seen, the maximum backoff value available in the current LTE specification is 960 ms. Backoff indicator values of 13, 14 and 15 are reserved in the Standard, for reasons not relevant to the present disclosure.

To spread tens of thousands of UEs characterized by a Beta distribution of arriving in a synchronized manner, backoff values in the order of several seconds would be required.

The present embodiment therefore provides an additional backoff indicator in the RAR PDU, i.e. in addition to (and not replacing) the existing BI in the MAC header. This additional backoff indicator would be read by the receiving eNB only when the UE wants to perform a 'Delay Tolerant access' request. The inclusion of both the legacy and new BI field provides backwards compatibility because, when sending the RAR PDU, the eNB does not know if the request is for a normal (i.e. legacy LTE) access request or for a 'Delay Tolerant access' request. However, the eNB could decide to include the new BI field only when overload, due to 'Delay Tolerant access' requests, is detected, so that the additional overhead would be reasonable and acceptable.

This is implemented by exploiting the fact that, in the current LTE specification, the BI is expressed as 4 bits, while only 13 index values are employed for representing BI. This means that, although the 4 bits used for signalling BI could take any one of 16 values (in decimal, values between 0 and 15), only 13 of these are used for indicating BI. The three potential index values which are reserved, namely values 13, 14 and 15, are not used in the adopted LTE standard. In the present embodiment, those three otherwise reserved index values are used to improve the access delay in extreme load conditions. This is feasible since many devices have versatile delay characteristics. For instance, location detectors used for fleet management, or smart metering devices, can tolerate delays up to a few hundreds of seconds.

Table 2 shows the BI values for extended backoff in accordance with the present embodiment.

TABLE 2

LTE backoff parameters consolidated with Extended backoff

| Indicator/Index | Backoff Parameter (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |

As will be appreciated by the reader, the table shows three new indicator values which are not included in normal back off. This can be compared with Table 1. It will be observed that now the three previously reserved index values have been used to accommodate extreme load such as could be caused due to the integration of a large number of devices.

Extended Backoff thus makes use of the reserved three index values in Backoff Indicator defined in the existing 3GPP standards. By this, the backoff parameter value can be set to a few seconds, whereas the existing implementation only provides for shorter backoff intervals. This offers the possibility of accommodating around 20000 devices. Extended Backoff enhances the delay performance of the devices, and reduces the number of devices barred from accessing the eNB.

The behaviour of legacy systems is inevitably an important consideration when proposing a change or extension to an existing standardised technology. In this case, a legacy system would not be expected to be presented with a Backoff Indicator value of 13, 14 or 15. The user of the standardised technology would not wish to place legacy technology in a situation which might give rise to unpredictable behaviour.

In fact, the extended backoff signalling would only arise between two compatible devices. The devices would determine, on the basis of identification, that each is capable of signalling using the extended backoff procedure described above. Thus, it is considered unlikely that a decoding error would arise.

A decoder, configured to implement an embodiment described herein, would be responsive to the otherwise reserved BI values, to provide backoff parameters as set out in table 2.

Enhanced Extended Backoff

A further method implemented in the wireless interface process 44 and the wireless interface process 104 enhances the existing approach, and can harness the above extended backoff method, by evaluating the exact number of devices trying to access the network at any given instant. Though the extended backoff method can be used to improve the delay characteristics in extreme conditions, it can be further enhanced if the exact number of devices trying to access the network at any given point of time is known.

This can be computed at the eNB by implementing a very simple counter. From the above description of the RACH procedure, it will be observed that the eNB will transmit RAR to all devices from which it has received preambles. Hence, by evaluating the number of RARs sent by the eNB, the number of devices trying to access the network can be evaluated. It will be evident to the reader that the same can be computed by counting the number of msg1 received or preambles.

By using this, the delay performance can be improved, as can other parameters. Though there is a possibility of two devices transmitting the same RAO, such a scenario will be considered as two different devices when calculating the number of devices. Thus, a good estimate can be obtained of the number of devices trying to access at any given time.

This offers a possibility of increasing the performance of the RACH process to a greater extent. By knowing the exact number of devices, the number of devices which can be accommodated can be increased, and the number of barred devices can be decreased.

While the enhanced extended backoff method can improve performance, computational complexity is also increased. This is because of the need to maintain the count of devices accessing the network by implementing a counter. However, it is most likely that any eNB will have a pre-existing counter available for use for this task, and the task only requires retention of the count value for a short duration.

Channel Aware Resource Allocation Using Device Specific Permissible Delay

It is entirely possible that, though a device may succeed in winning contention, the transmitted preamble may be lost due to bad channel conditions. To counter that, a method can be implemented, as an alternative to the approach above, taking into account channel conditions and the maximum allowed delay of each device requesting to be served.

It will be appreciated that this method can be implemented as an alternative to the above, or could be implemented alongside the above described Enhanced Extended Backoff method, so that the appropriate method can be used depending on channel conditions.

In contrast to other approaches, in this method, no classes of devices are defined, but the exact delay constraint of each device is considered, approaching the requirements of M2M communication in a more realistic way. In this manner, the number of effectively served requests increases, or the number of barred devices decreases.

It is assumed that each user or MTC device experiences independent fading and that the SNR over lth RB as seen by kth user is given by $$\gamma_{k,l} = \frac{P_{k,l} h_{k,l}^2}{\sigma^2} \qquad (1)$$

where $\sigma^2$ is the power of the additive white Gaussian noise at the receiver (eNB), $P_{k,l}$ is the transmit power of the kth user at the lth RB, and $h_{k,l}$ is the corresponding fading amplitude which is modelled as a time varying Rayleigh random variable with the average SNR for each user depending on the distance from the base station eNB.

Figure 10:
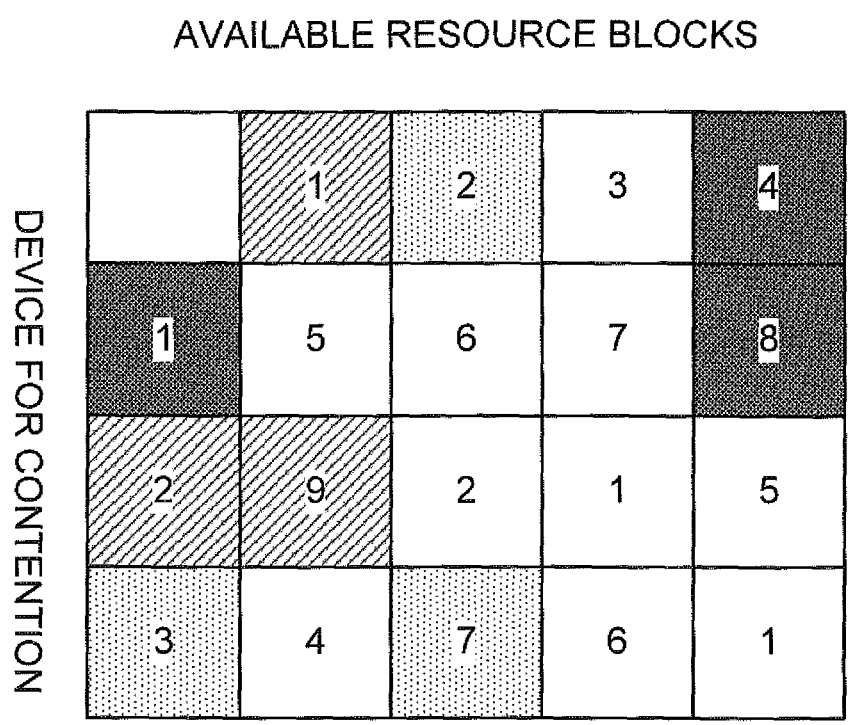
FIG. 10 is a graph illustrating channel resource allocation for a described embodiment.

FIG. 10 shows a channel information matrix in which each element represents the SNR experienced by a particular device with respect to a corresponding resource block. In the example, there are three devices (rows) and four resource blocks. Each device selects the RB with the best possible SNR measurement, thereby enhancing the success probability. In this example, device 1 transmits using the 4th RB, device 2 transmits using the 1st RB and device 3 transmits using the 2nd RB. Shading is used to illustrate these selections.

When the number of devices exceeds the number of available RAOs, then, before building the channel state matrix, excess devices needs to be barred from transmission. In this method, barring is based on the maximum delay tolerance of each device. The devices with high delay tolerance are barred and devices with low delay tolerance are given priority.

Pseudo code for this method is given below:

```
While the available RAO's R=1, 2,...200 not equal to 0,
{
    Loop through all users trying to access the network
    {
        Give LTE H2H users priority and allocate H RAOs
        Compute available RAOs for MTC devices: M = R-H
        If M exceeds the number of accessing MTC Devices
        {
            {
            Access Barring is not needed
            Build the channel state information matrix
            and allocate the RB corresponding to best
            SNR γ_{k, l}, i.e. RB_l to the kth MTC device.
            }
        Else
            {
            Sort the MTC devices in ascending order with
            respect to d_k, where d_k is the maximum delay
            tolerance for the MTC device.
            Select the first M devices and bar the
            remainder.
            Build the channel state information matrix
            and allocate the RB corresponding to the
            best SNR γ_{k,l}, i.e. RB_l to the kth MTC device
            }
        End If
    }
    End User Loop
}
End While loop
}
```

For a specific example, the above process can be described as follows. A set of available RAOs is considered. For this example, it is assumed that there are 200 RAOs per second, per cell. Priority is given to LTE H2H users. These "human to human" users are assumed to be particularly delay sensitive, and no additional delay can be built into the manner in which communication requests are handled between two such parties. The number of LTE users is subtracted from the number of RAOs, leaving a residual number of RAOs available for MTC use.

The number of LTE devices is added to the number of MTC devices. If this number does not exceed the number of RAOs, then no particular overload resource allocation is required. Simply put, the channel information matrix is built, and each MTC device selects that channel RAO which best delivers in terms of SNR.

Otherwise, the set of MTC devices is sorted in ascending order of delay tolerance—the devices with little or no tolerance to delay will be prioritised over those devices which can wait for resource to become available. The 200 least delay tolerant devices are selected, the remainder are blocked from the network for the time being.

Strictly speaking, a specific "sort" step is not essential to the process. The "sort" and "select" steps may be combined in a brute force search. Since the objective is to identify the 200 least delay tolerant devices, the list of devices does not need to be ordered to achieve this, Depending on the specific implementation, it may be more computationally efficient to perform a sweep of the list of devices, populating a set of 200 devices as the sweep is conducted. The 200 member set might, for instance, be constructed as a linked list or as a tree, to enable members to be inserted and then excluded as the sweep progresses. So, in this case, it may be possible to construct a process as follows:

1. Select 200 devices from the list of devices
2. Identify the delay tolerance of each device
3. Set a "max delay tolerance" quantity to be equal to the maximum identified delay tolerance of the 200 devices
4. Load the devices into a linked list, ordered by delay tolerance
5. Exclude the 200 devices from the list of devices
6. Select a further device from the list of devices
7. Identify the delay tolerance of the device
8. Determine if the delay tolerance is less than or greater than "max delay tolerance"
   a. If the delay tolerance is greater than "max delay tolerance", reject the device
   b. If the delay tolerance is less than "max delay tolerance"
      i. insert the device into the linked list at the appropriate position
      ii. remove the device previously with the identified maximum delay tolerance in the linked list
      iii. revise the "max delay tolerance" quantity to be equal to that of the device, in the linked list, now with the maximum identified delay tolerance
9. Exclude the device from the list of devices
10. Repeat steps 6 to 9 until all devices have been excluded from the list.

The result of this will be a linked list containing the 200 devices with the lowest delay tolerance. Though the process may appear complex, linked list insertion and deletion operations are computationally efficient. Inevitably, there will be a sequential search to find the correct insertion point in the linked list for each device (in step 8bi).

The question as to which particular implementation should be employed will involve consideration as to whether this use of n sequential searches of 200 items is more or less efficient than a sort of n items into a sorted list, where n may be in excess of 10,000.

Alternatively, it might be practical to perform a succession of sweeps for devices whose delay tolerance is, for instance, lower than a particular value. In this case, the "search and select" phase of the above process could be characterised by the following steps:

1. Set an arbitrary threshold for the delay tolerance
2. Identify all devices with a delay tolerance below the threshold
3. Determine the number of identified devices
   a. If the number of identified devices is less than 200, increase the threshold by 50%
   b. If the number of identified devices is more than 200, decrease the threshold by 50%
4. Repeat steps 1 to 3, with decreasing amounts of adjustment of the threshold as the number of devices converges on the correct number In step 3, it might be appropriate for successive adjustments of the threshold to be (0.5ⁿ) where n is the number of iterations. However, if the first arbitrary threshold is significantly divergent from the expected final value of the threshold (such as, if many thousands of devices fall beneath the threshold, or if none do), then a more significant adjustment of the threshold may be appropriate. Search strategies of this type are well known and are not part of the present disclosure. Other modifications of this approach will be evident to the reader.

Further alternatively, the identification of the 200 least delay tolerant devices may be achieved by conducting the following algorithm:

1. Sweep the list of devices to identify the least delay tolerant device
2. Add the identified device to the list of least delay tolerant devices
3. Remove the identified device from the original list of devices
4. Repeat steps 1-3 200 times The computational efficiency of any of the above algorithms, to find the 200 least delay tolerant devices, may be implementation specific. As such, the choice of algorithm is left to the reader to make. Further, a wide variety of other search and selection algorithms exist, and many would be appropriate for this purpose.

Thus, in accordance with this, the above recited pseudo-code includes the following steps:

Sort the MTC devices in ascending order with respect to $d_k$, where $d_k$ is the maximum delay tolerance for the MTC device.

Select the first M devices and bar the remainder.

which can be replaced, more generally, by the following:

Pick the M MTC devices with the lowest delay tolerance, and bar the remainder.

As demonstrated above, there are numerous methods of achieving this, not all of which involve performing a sort. Whether a sort is the most efficient manner of achieving the end result will depend on the implementation, including considering the size of the system, the available processing capabilities, and the speed at which the end result needs to be provided.

The channel allocation step is then repeated, and thence the sorting, blocking and re-allocation are continued until all devices have been given access.

Channel Aware Resource Allocation Using Device Specific Permissible Delay for Correlated or Highly Dense Environments It is reasonable to assume that the number of M2M devices in operation will continue to increase, and may well increase rapidly in the near future. This will increase the density of devices in a single cell. It is thus conceivable that the channel information matrix, as constructed in the previously described method, will result in two devices seeking access to the same RAO, as SNR patterns for two neighbouring devices may not be significantly different from each other. Thus, certain modified versions of the above-described approaches may be required.

In these scenarios, instead of choosing the best RB for each device, the first few best RBs are selected from the channel matrix. Then, highest priority devices are allocated, at random, to RBs selected as the best group thereof. By doing this, allocation fairness is enhanced.

The pseudo code for this algorithm is shown below.

```
While the available RAO's R=1, 2,...200 not equal to 0,
{
    Loop through all users trying to access the network
```

```
{
    Give LTE H2H users priority and allocate H RAOs
    Compute available RAOs for MTC devices: M = R−H
    If the density D of devices is more than a
threshold level
    {
        {
            Sort the MTC devices in ascending order with
            respect to $d_k$, where $d_k$ is the maximum delay
            tolerance for the MTC device.
            Build the channel state information matrix.
            Select the first few RBs with best possible
            SNR for all devices on an average.
            Randomly allocate these selected RBs to the
            high priority sorted devices contending in
            the densely correlated environment.
        }
        Else
        {
            Sort the MTC devices in ascending order with
            respect to $d_k$, where $d_k$ is the maximum delay
            tolerance for the MTC device.
            Select the first M devices and bar the
            remainder.
            Build the channel state information matrix
            and allocate the RB corresponding to best
            SNR $\gamma_{k,l}$, i.e. $RB_l$ to the kth MTC device
        }
    End If
    }
End User Loop
}
End While loop
}
```

As will be seen, the pseudo code is the same as the previous routine, until a decision is taken on building the channel information matrix. Now, when building the channel information matrix, the first few best available RB's are selected and these are allocated randomly to high priority devices. This will improve the performance in correlated environment compared to the previous scenario since the probability of allocating a well performing RB to a high priority device is increased.

As before, the "sort and select" approach to determining the set of least delay tolerant M2M devices can be generalised to any other approach to achieving the end result, not necessarily involving a sort.

This approach is adopted only in dense environments because of its fairly complex nature. Also, in non-correlated environments, channel aware resource allocation works equally well as this and its complexity is lower.

The number of best performing RB's to be selected again depends on density—it is possible to switch back to the normal implementation (i.e. normal channel aware resource allocation) once the density is at a manageable level.

With the Extended Backoff method described above, more devices can be accommodated with versatile delay characteristics. The fact that different MTC devices have different delay constraints can be exploited. Some devices might have elastic delay constraints and could tolerate a certain amount of delay. These can be backed off for a relatively long duration in comparison with high priority devices.

Also, by evaluating the exact number of devices trying to access, other properties and procedures can be enhanced, as well as random access.

The above two methods are modifications to standards set forth by 3GPP. These can be included in "LTE standards" to make it more flexible to handle versatile scenarios.

The channel aware allocation is a more realistic way since we are considering the channel conditions into account. Further, because of the increased number of M2M applications, there is a high possibility of device dense environments which is handled by using a hybrid method as exemplified by the most latterly described method.

All of the above methods ensure that the probability of collision is reduced. They also improve the delay characteristics and the number of barred devices. These are implemented in a way not affecting the current H2H communication.

The Extended Backoff and Enhanced Backoff methods provide improvements to the methods set forth by 3GPP. They handle extreme load conditions better than other standard methods. It is shown that the access delay and number of barred devices can be improved by adopting these methods. The Channel Aware Resource Allocation takes into consideration channel conditions before allocating resources. It considers the delay requirements of each device for deciding the priority. Considering channel quality in the scheduler's criteria improves the error performance of devices. Comparison between the standard scheduling algorithm and the proposed method suggests that, channel aware allocation considering the allowed delay of each device performs better than any of the class based scheduling algorithms under extremely loaded conditions. A hybrid version of Channel Aware Resource Allocation is described above, to handle RAN overload in environments where device density is high. This increases the success probability and fairness in comparison with the LTE standard algorithm.

In order to evaluate the network performance under different access intensities, two different traffic models will now be used as examples, as set out in Table 3.

TABLE 3 traffic models

| Characteristics | Traffic model 1 (Realistic Scenario) | Traffic model 2 (Extreme Scenario) |
| --- | --- | --- |
| Number of MTC devices | 1000, 3000, 5000, 10000, 30000 | 1000, 3000, 5000, 10000, 30000 |
| Arrival distribution | Uniform distribution over T | Beta distribution over T |
| Distribution period (T) | 60 seconds | 10 seconds |

Traffic model 1 can be considered as a realistic scenario in which MTC devices access the network uniformly over a period of time, i.e. in a non-synchronized manner.

Traffic model 2 can be considered as an extreme scenario in which a large number of MTC devices access the network in a highly synchronized manner, e.g. after a power outage.

Table 4 summarizes the simulation parameters and it includes a single cell environment with uplink transmissions.

TABLE 4 simulation parameters

| Parameter | Setting |
| --- | --- |
| Cell bandwidth | 5 MHz |
| PRACH Configuration Index | 6 |
| Total number of preambles | 54 |
| Number of available RAO's | 200 |

Under this setting 200 RAOs are allocated each second for RA. The total number of available preambles is 54; 10 preambles are reserved for non-contention-based random access. The number of H2H devices arriving per second per cell is assumed to be fixed and according to the existing standards. The average SNR of MTC devices uniformly ranges from 0 dB to 10 dB. The maximum delay tolerance of each device ranges from 10 ms to 10 minutes.

The number of M2M devices will be in the tens of thousands. Hence, existing approaches, as set out in the established standards, will fail when such a huge number of devices try to access the network in a synchronized manner.

Figure 11:
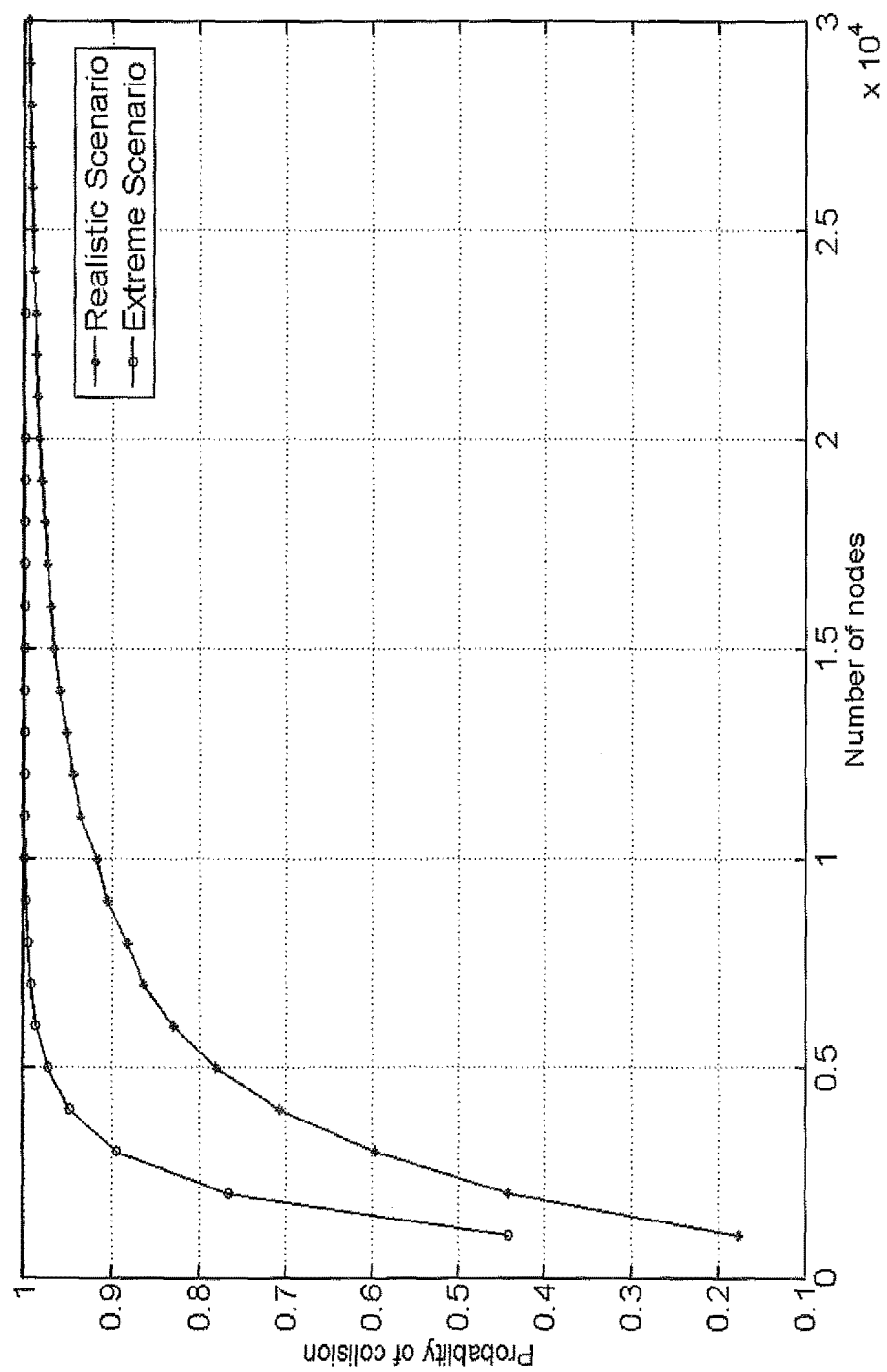
FIG. 11 is a graph illustrating failure profiles for specific examples of described embodiments.

The above-described embodiments are used, in order to handle such scenarios when the number of devices is too high for existing standards. The severity of failure when number of devices is excessive, is illustrated in FIG. 11. From this figure, it can be observed that collision is almost inevitable when the number of devices is above 5000.

Figure 12:
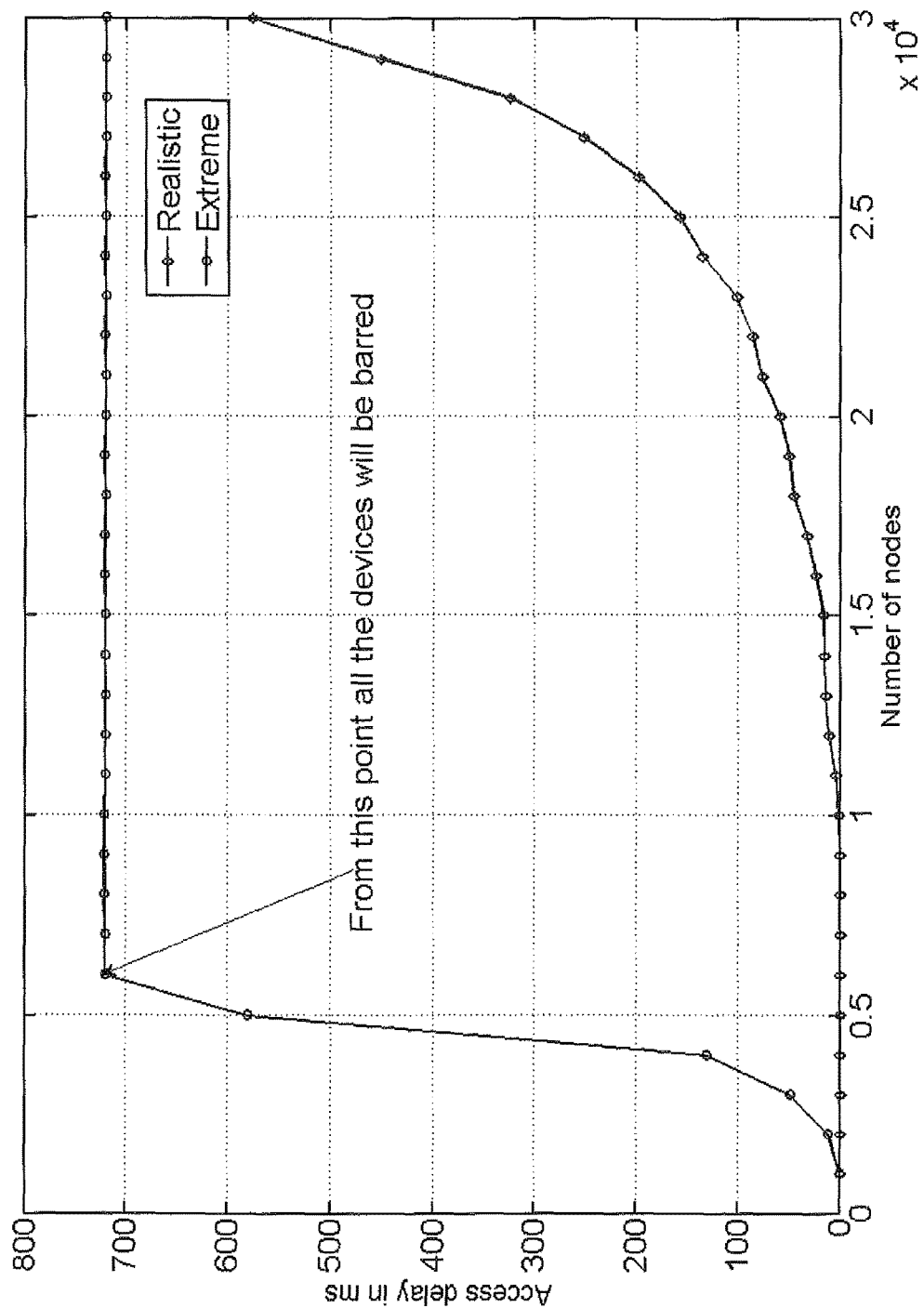
FIG. 12 is a graph illustrating access delay performance for a first background example.

FIG. 12 shows the access delay performance with normal backoff. From the figure it will be seen that, under synchronized access scenarios for a high number of devices the previously available methods fail to perform. This motivates the need for better methods.

Figure 13:
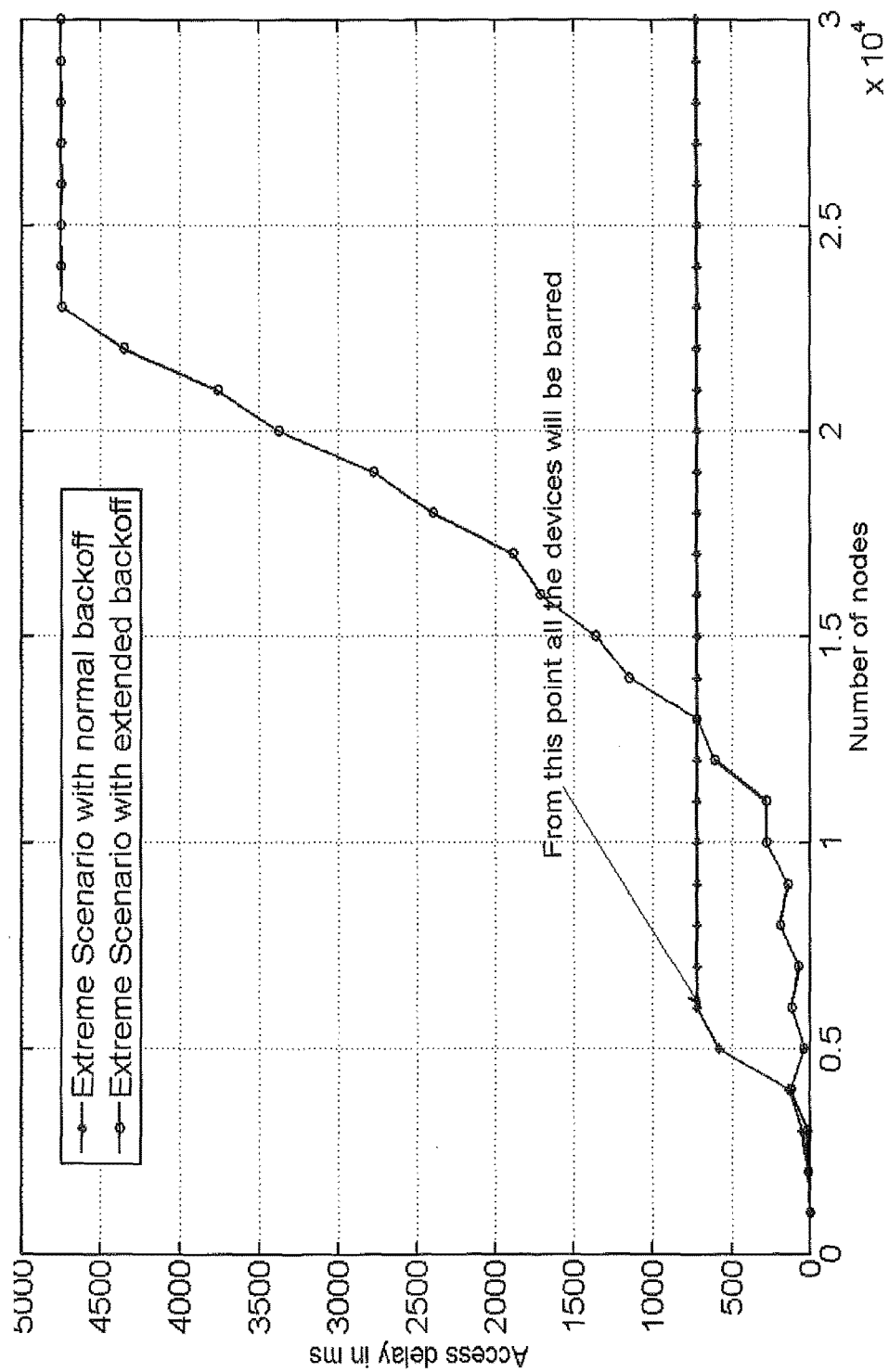
FIG. 13 is a graph comparing access delay performance of the background example with that of a second background example.

FIG. 13 compares the access delay for extreme load conditions with normal and extended backoff. In the simulation the backoff has been increased from 960 ms to 5000 ms in order to improve extreme conditions. From FIG. 13 it can be observed that access delay has been improved now, even in the extreme scenario, using the proposed method.

Without extended backoff, from the graph it can be observed that at most 6000 devices could be accommodated by adopting load control (Arrows pointing in the graph). This number has been increased to around 20000 by implementing extended backoff. Thus there is almost a 3 fold increase in network accommodation. Apart from this there is also an observable improvement in delay characteristics.

Figure 14:
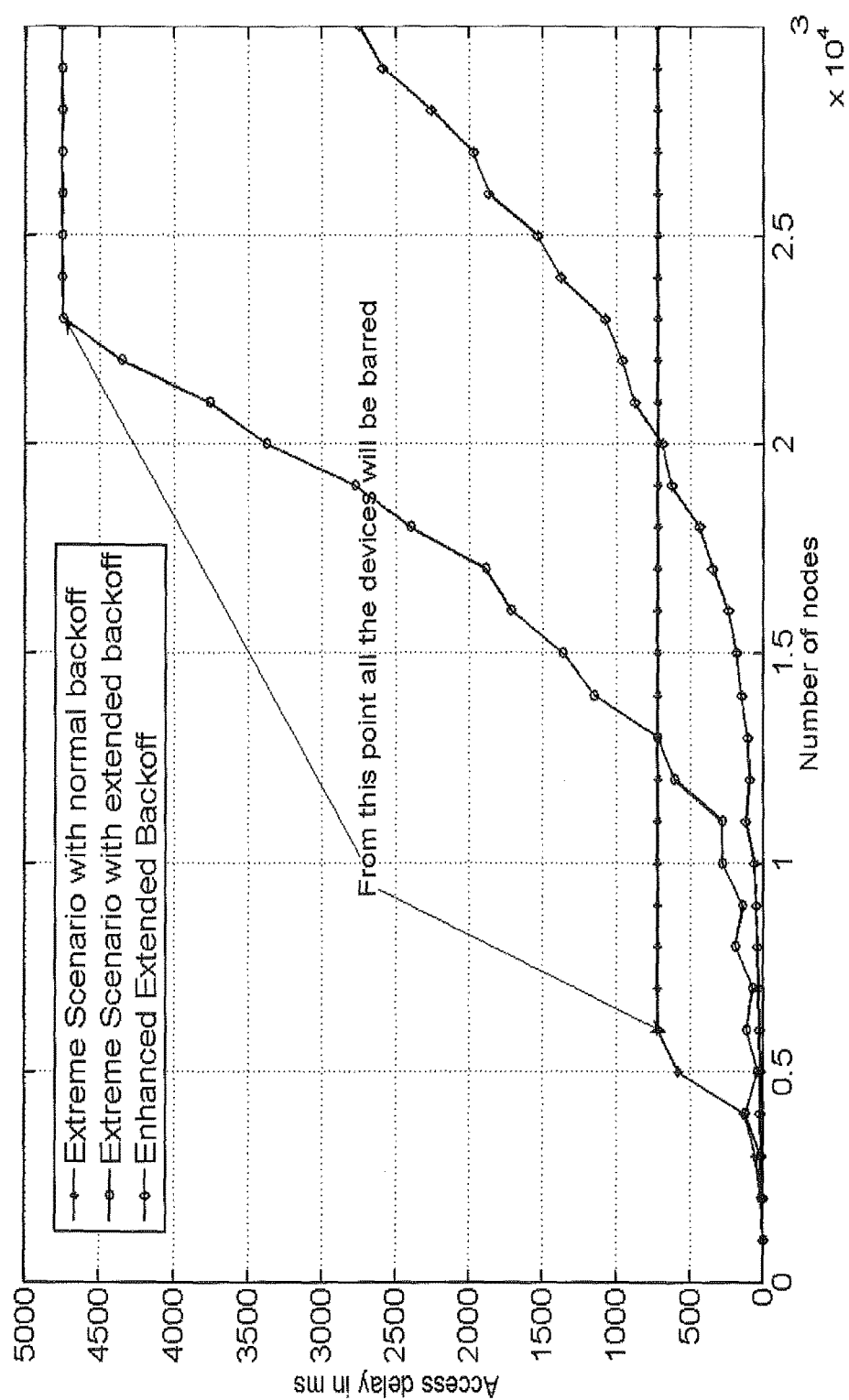
FIG. 14 is a graph comparing access delay performances of the background examples with a first example of a described embodiment.

FIG. 14 shows demonstrable improvement obtained by implementing enhanced extended backoff as described above. From FIG. 14, it can be observed that access delay has been reduced for extreme conditions using enhanced extended backoff in comparison with normal extended backoff. Also, there is an improvement in the number of nodes that can be accommodated.

Figure 15:
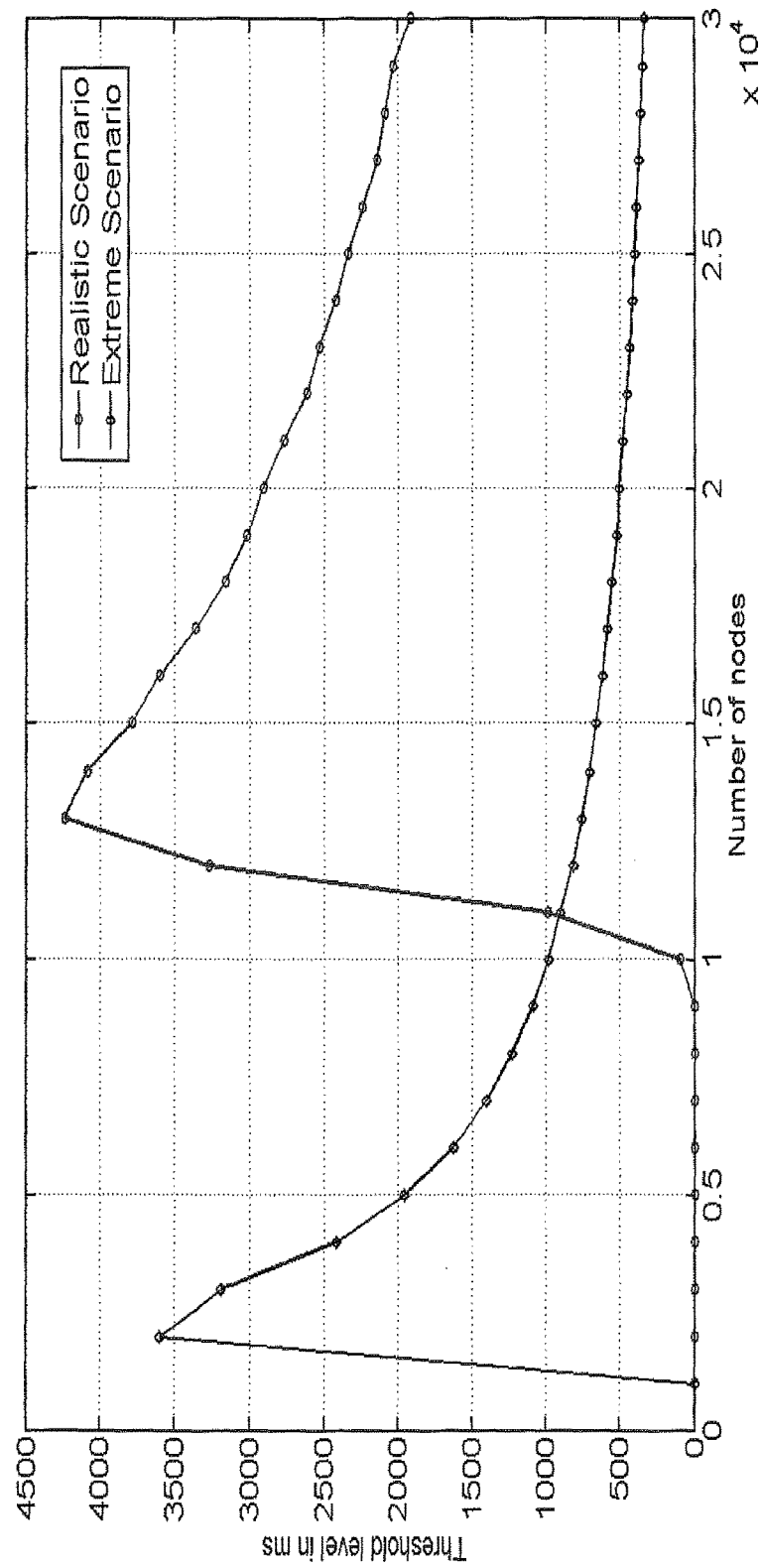
FIG. 15 is a graph comparing threshold delay level for two scenarios of use of a described embodiment.

FIG. 15 shows the variation of threshold delay level as the number of devices increases. From the figure, it can be seen that, as the number of devices increases, then the supported average threshold delay level decreases. This threshold delay level indicates the maximum delay tolerance that can be supported for a given number of devices. The decrease is more severe in the case of extreme scenarios. Also, the peaks in the graphs indicate that, until that point, delay tolerance can be neglected, since the number of devices contending will be less than the number of available opportunities. Thus the constraint is more relaxed in the realistic scenario compared to the extreme scenario.

The threshold level serves as a good indicator in managing the network. This will also give an idea as to the number of devices, and the amount of permissible delay, that can be accommodated in the network without any access barring.

Figure 16:
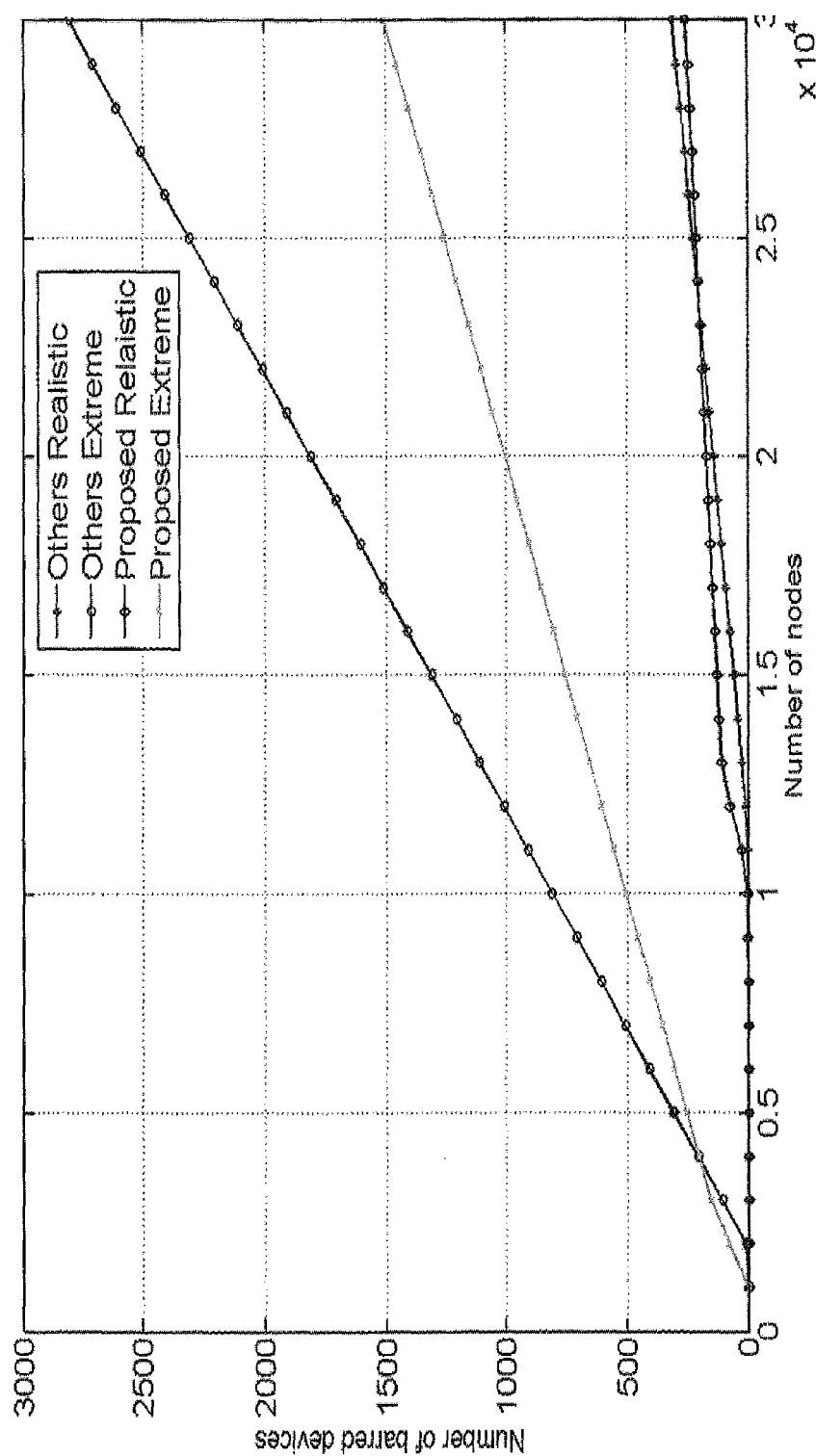
FIG. 16 is a graph comparing device barring performance of the background examples and examples of the described embodiments.

FIG. 16 compares the number of barred devices between the standard algorithms and proposed algorithm in both realistic and extreme scenarios. From FIG. 16 it can be observed that, performance of both of the algorithms is similar, in realistic scenarios. But the proposed approach of this disclosure outperforms others in extreme scenarios. The number of barred devices has been reduced in the case of the presently disclosed approach, and thus the success probability has been increased. From FIG. 16, it is shown that, on an average, 30 to 40% improvement is obtained by adopting the described approach in extreme scenarios.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of performing radio access network (RAN) level access barring for a machine-to-machine (M2M) device in a wireless communications network, comprising:
    maintaining a count, by an eNodeB, of contention based random access channel (RACH) requests to the M2M device from other M2M devices in the network,
    determining from received RACH requests, a number of least delay tolerant requesting M2M devices, and
    delaying the allocation of channel resource blocks to requesting M2M devices in accordance with the count and the determination of the delay toleration.

2. A method in accordance with claim 1 wherein the maintaining of a count comprises counting RACH requests received by the M2M device.

3. A method in accordance with claim 1 wherein the maintaining of a count comprises counting random access responses (RAR) sent by the M2M device in response to RACH requests.

4. A machine-to-machine (M2M) communications device for use in a communications network, configured to perform a method in accordance with any one of claims 1 to 3, the M2M device comprising:
    a central processing unit operable to execute program instructions presented thereto,
    a random access memory,
    a non-volatile storage,
    an input/output interface, and
    a wireless interface.

5. A non-transient computer program product, comprising computer executable instructions which, when loaded into a suitable machine-to-machine communications device, cause that device to perform a method in accordance with any one of claims 1 to 3.

* * * * *